United States Patent
Vigilante et al.

(10) Patent No.: US 8,674,622 B2
(45) Date of Patent: Mar. 18, 2014

(54) LED-BASED LIGHTING MODULE AND CONTROL METHOD

(75) Inventors: Giacinto Vigilante, Windermere, FL (US); Russ Lawson, Hernando, FL (US); Lynn M. Hurt, Brooksville, FL (US)

(73) Assignee: Sparton Corporation, Schaumburg, IL (US)

( * ) Notice: Subject to any disclaimer, the term of this patent is extended or adjusted under 35 U.S.C. 154(b) by 153 days.

(21) Appl. No.: 13/435,383

(22) Filed: Mar. 30, 2012

(65) Prior Publication Data

US 2012/0319620 A1 Dec. 20, 2012

Related U.S. Application Data

(60) Provisional application No. 61/498,730, filed on Jun. 20, 2011.

(51) Int. Cl.
*H05B 37/02* (2006.01)

(52) U.S. Cl.
USPC ............................. 315/297; 315/247; 315/307

(58) Field of Classification Search
USPC .......... 315/225, 246, 247, 291, 297, 307, 308
See application file for complete search history.

(56) References Cited

U.S. PATENT DOCUMENTS

| | | | |
|---|---|---|---|
| 7,049,761 B2 | 5/2006 | Timmermans et al. | |
| 7,791,326 B2 | 9/2010 | Dahlman et al. | |
| 7,855,515 B2 | 12/2010 | Huang et al. | |
| 2011/0043135 A1 | 2/2011 | Shim | |
| 2011/0227490 A1* | 9/2011 | Huynh | 315/185 R |
| 2011/0248640 A1* | 10/2011 | Welten | 315/210 |

* cited by examiner

*Primary Examiner* — Don Le
(74) *Attorney, Agent, or Firm* — Quinn Law Group, PLLC

(57) ABSTRACT

A light-emitting diode (LED) module includes a body assembly, a printed circuit board assembly (PCBA) having LEDs, and a power conditioning board having a controller. The PCBA and power conditioning board are encapsulated by the body assembly. The power conditioning board is driverless, i.e., characterized by an absence of a switching power supply, and includes a rectifier and reducer. The reducer detects an AC waveform zero-crossing and phase angle of AC line power, reduces the rectified voltage, and selectively turns the LEDs on or off using corresponding signals. The controller receives the reduced peak-to-peak rectified voltage from the reducer, adjusts operating parameters of the reducer in response to the phase angle and zero-crossing to illuminate or extinguish some/all of the LEDs and increase the power factor of the LED module, and adjusts the limiter to provide a constant power level to the LEDs.

17 Claims, 4 Drawing Sheets

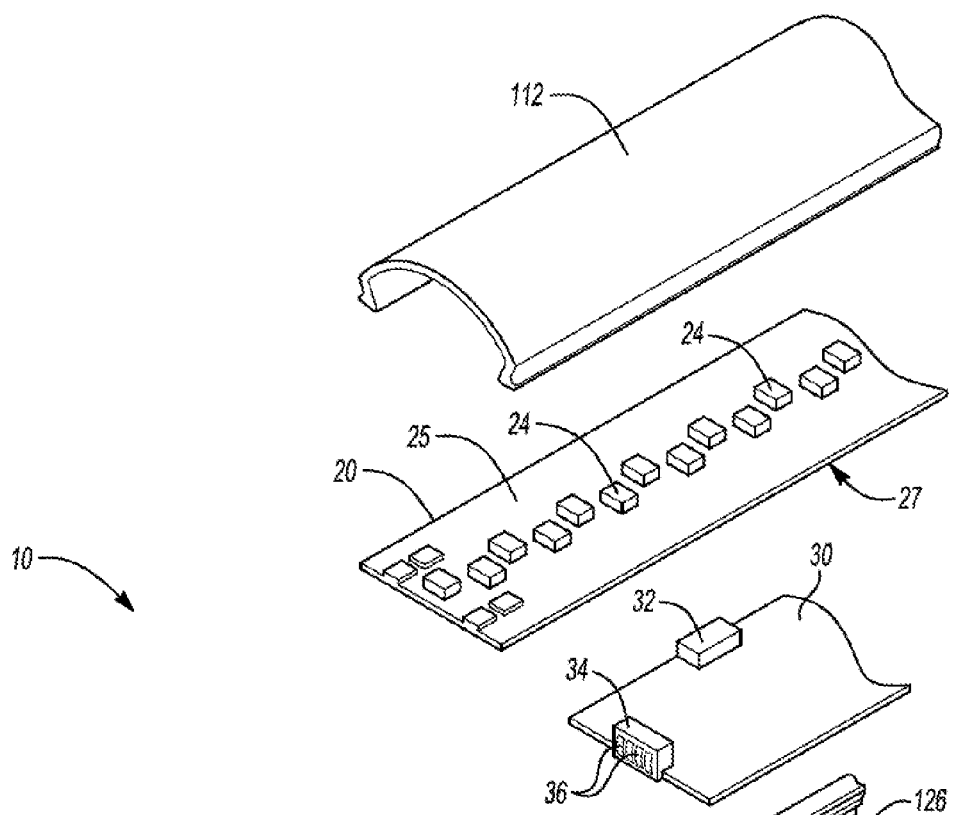
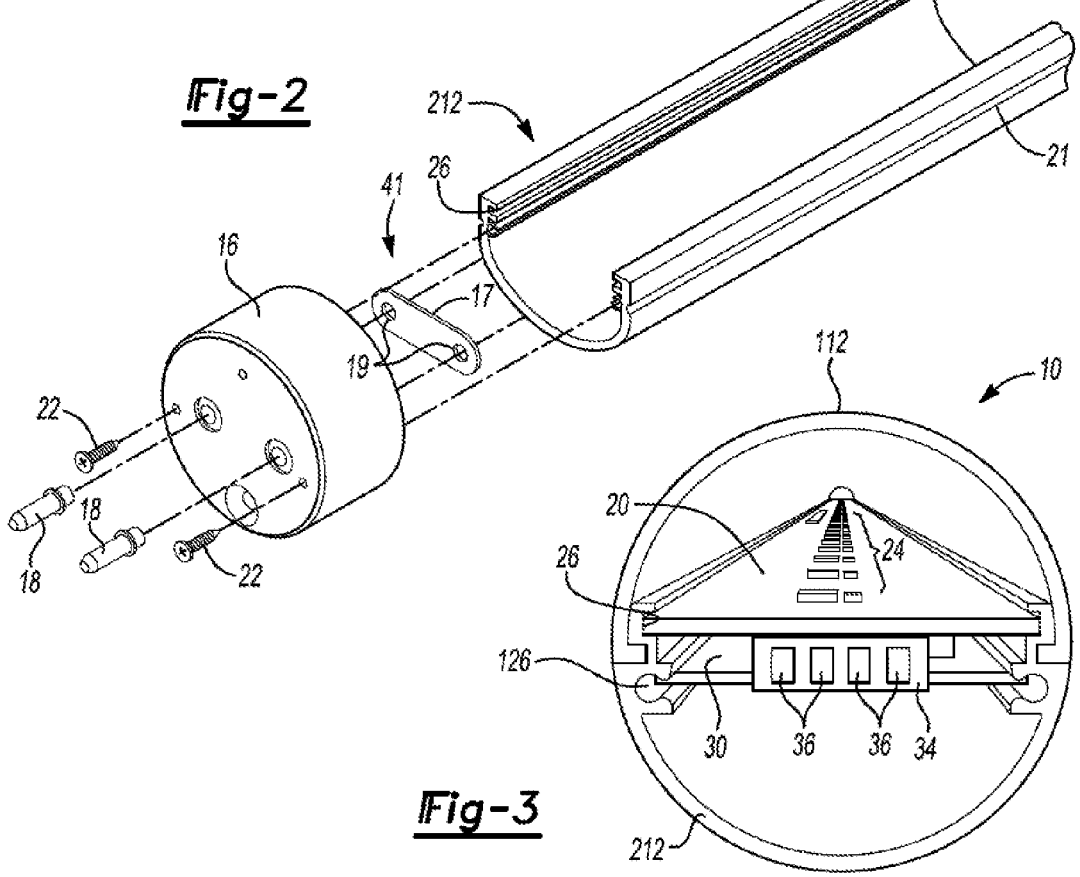
Fig-2
Fig-3

LED-BASED LIGHTING MODULE AND CONTROL METHOD

CROSS-REFERENCE TO RELATED APPLICATIONS

This application claims the benefit of U.S. Provisional Patent Application No. 61/498,730 filed on Jun. 20, 2011, which is hereby incorporated by reference in its entirety.

TECHNICAL FIELD

The present disclosure relates to a light-emitting diode (LED)-based lighting module and a control method for powering the same.

BACKGROUND

Businesses and consumers have begun considering the benefits of alternative forms of lighting as a consequence of rising energy costs. Inefficient incandescent bulbs have been largely replaced with standard T8-sized fluorescent lamp tubes in ceiling light fixtures. Likewise, compact fluorescent (CFC) bulbs in various sizes have emerged as cost-effective replacements for incandescent bulbs. However, CFC and other fluorescent bulbs contain trace levels of mercury, and thus breakage or replacement of such bulbs typically requires special disposal and handling procedures.

The unique properties of light-emitting diodes (LEDs) has led to the development of LED bulbs as viable replacements for existing fluorescent and incandescent bulbs. The operating life of an LED bulb vastly exceeds that of a typical fluorescent bulb. Additionally, unlike fluorescent bulbs, the life of an LED bulb is not severely degraded by frequent on/off cycling. This makes LED bulbs an ideal choice for various applications, e.g., closet, garage, or storage room lighting.

The long relative working life of an LED bulb coupled with the high efficiencies provided by emerging LED technology has spawned a rapidly growing but still nascent industry in LED replacement bulbs. The relatively high initial cost of an LED retrofit bulb will continue to decrease as market share increases. However, the cost of a conventional LED replacement bulb may remain less than optimal relative to fluorescent designs due in large part to the substantial costs associated with LED power supply switching and conversion methods.

SUMMARY

A light-emitting diode (LED) module is disclosed herein. The LED module is driven using an existing AC line voltage source that is external to any lamp or other fixture using the LED module. The present design and control approach is therefore referred to hereinafter as "driverless". The present driverless approach may achieve greater than 90 percent efficiencies with a power factor in excess of 90 percent, along with other potential benefits as set forth herein.

In particular, the LED module includes a body assembly, a printed circuit board assembly (PCBA) having a plurality of light emitting diodes (LEDs), and a power conditioning board. The PCBA and power conditioning board are encapsulated by the body assembly. The power conditioning board is characterized by an absence of a switching power supply. The power conditioning board includes a full-wave voltage rectifier, a reducer, and a limiter.

In an associated control method, the rectifier outputs a peak-to-peak rectified voltage as a function of AC line power. The reducer detects the peak-to-peak rectified voltage, phase angle, and AC waveform zero-crossing of the AC line power, reduces the rectified voltage to provide a reduced voltage, and selectively sends a signal to turn on/illuminate or turn off/extinguish the LEDs as needed.

The controller, which is arranged in a closed control loop with the LEDs via the reducer and the limiter, receives the reduced peak-to-peak rectified voltage and AC waveform zero-crossing from the reducer. The controller automatically adjusts operating parameters of the reducer in response to the detected phase angle and zero-crossing to thereby selectively illuminate or extinguish some/all of the LEDs and thereby increase the power factor of the LED module. The controller also selectively adjusts a characteristic of the limiter to provide a substantially constant power level to the LEDs.

In another embodiment, the LED module includes a two-piece body assembly having a plastic lens portion, i.e., a translucent, clear, or frosted portion, and an aluminum shell portion. The aluminum shell portion is thermally conductive, and defines a first set of axial grooves positioned adjacent to the lens portion and a second set of axial grooves positioned between the first axial groove and the shell portion. The PCBA in this embodiment is supported along its edges by the first set of axial grooves. The power conditioning board is likewise supported along its edges by the second set of axial grooves.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a schematic exploded view illustration of a portion of the LED module shown in FIG. 1.

FIG. 3 is a schematic end view illustration of the LED module of FIG. 1 with a removed end cap.

DETAILED DESCRIPTION

Figure 1:
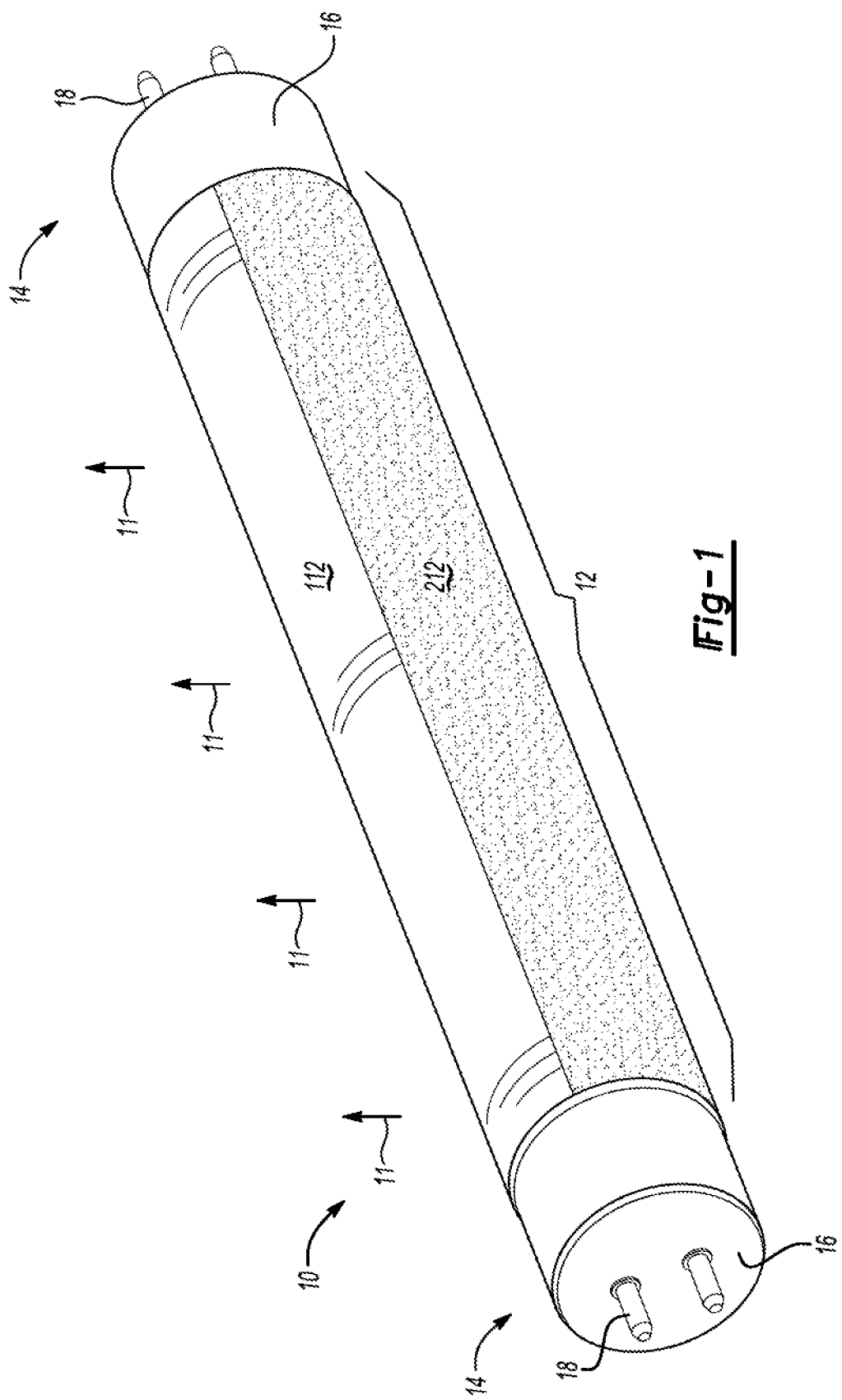
FIG. 1 is a schematic perspective view illustration of an example LED module as disclosed herein.

Referring to the drawings, wherein like reference numbers refer to the same or similar components throughout the several views, an example light emitting diode (LED) module 10 is shown in FIG. 1. The LED module 10 may be configured as a conventional cylindrical retrofit bulb, e.g., a T8 bulb in the example embodiment shown in FIG. 1. However, while the T8 tube is a common tube size for use in fluorescent ceiling lamp fixtures, those of ordinary skill in the art will recognize that the present design may be readily scaled for use in other fixtures.

Conventional approaches for powering LED bulbs using multi-phase/alternating current (AC) power typically generate a relatively low direct current (DC) voltage level using a switching power supply. By way of contrast, the driverless approach set forth herein instead directly energizes a string of LEDs arranged on one or more printed circuit board assemblies (PCBAs). This approach eliminates the need for relatively inefficient and costly switching power supplies. As is well understood in the art, conventional switching power supplies are only about 70 to 85 percent efficient. As a result, a substantial amount of power may be lost as heat during the power switching process. Moreover, the cost of implementing conventional switching power supplies may continue to increase in conjunction with rising power supply efficiencies. The LED module 10 disclosed herein thus provides an alternative cost-effective approach to conventional LED bulb designs.

The present LED module 10 includes a cylindrical body assembly 12. Each end 14 of the LED module 10 is enclosed by an end cap 16. The different shading patterns used in FIG. 1 represent an optional two-piece clamshell design in which light (arrows 11) is emitted through a lens portion 112. The remainder of the body assembly 12 is constructed of an opaque shell portion 212. Electrical contact pins 18 extend axially outward from each of the end caps 16. In different embodiments, one or both electrical contact pins 18 at a given end 14 of the LED module 10 may be connected to neutral/ground, while one or both of the contact pins 18 at the other end 14 may be connected to multi-phase/alternating current (AC) line power, for instance the source 46 shown in FIG. 4.

An electrical ballast of the type used to limit voltage to a conventional fluorescent fixture is not required when using the present LED module 10. If the LED module 10 is to be used as a retrofit bulb, the ballast of the existing light fixture may be simply removed or bypassed. Incoming AC power is then tied directly to either side of the light fixture. Polarity is not important in the present design. Thus, any incoming wire can be connected to either side of the light fixture, and thus to either side of the LED module 10 of FIG. 1. New light fixtures may be designed without an electrical ballast.

Referring to FIG. 2, the lens portion 112 and the opaque shell portion 212 may connect to each other to form a clamshell as noted above. The respective diffuser and opaque shell portions 112 and 212 may be approximately equal in size, and may be positioned with respect to each other to form a generally cylindrical whole. The portions 112 and 212 may include an optional edge feature 21 that enables a snap-fit or tongue-and-groove connection. In one embodiment, the diffuser portion 212 may be constructed of shatter-resistant plastic configured to pass emitted light (arrows 11 of FIG. 1) with a desired level of diffusion and/or filtering, e.g., ultraviolet or infrared filtering. The shell portion 212 is thermally conductive and may be constructed of aluminum or another material providing sufficient voltage isolation.

An electrical contact plate 17, e.g., a copper bar, is connected within each end cap 16, only one of which is shown in FIG. 2 for simplicity. The contact plate 17 may define holes 19 through which the electrical contact pins 18 extend. Fasteners 22 may be used in a particular embodiment to further secure each end cap 16 to the remainder of the LED module 10. The fasteners 22 may be self-tapping sheet metal screws in one possible embodiment. In such an embodiment, the fasteners 22 align with axial grooves 126 of the shell portion 212 as indicated by arrow 41, and then engage and cut threads into the shell portion 212, e.g., in a slot 126 as shown in FIG. 3 and explained below.

Figure 4:
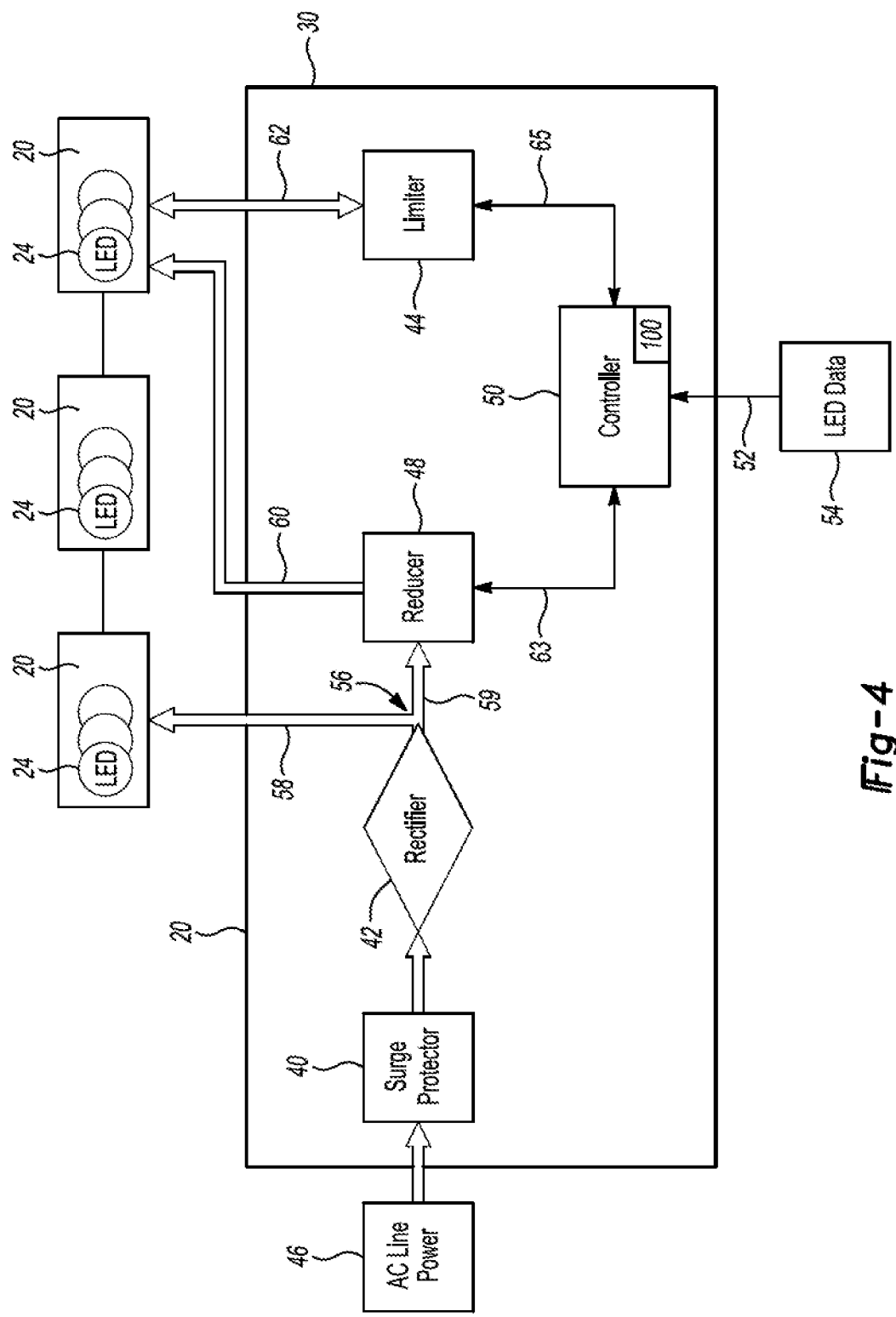
FIG. 4 is a schematic block diagram describing elements of the power conditioning circuit used within the module of FIG. 1.

A printed circuit board assembly (PCBA) 20 having respective first and second sides 25 and 27 and a plurality of light-emitting diodes (LEDs) 24 may be inserted into an axial groove 26 defined by the shell portion 212. The LEDs 24 may be arranged in electrical series in any desired pattern on the first side 25 of the PCBA 20 and oriented toward the lens portion 112. The second side 27 of the PCBA 20 is oriented toward the shell portion 212. While only one PCBA board 20 is shown in FIG. 1, those of ordinary skill in the art will recognize that multiple PCBA boards 20 may be connected in series as shown in FIG. 4 to extend the LED module 10. In such an approach, a relatively long PCBA may be constructed from a plurality of PCBAs 20, thereby simplifying manufacturing.

The LED module 10 of FIG. 1 also includes a power conditioning board 30. The power conditioning board 30 is received within the axial groove 126. The axial groove 126 may be defined by the shell portion 212, and may be parallel to the axial groove 26 as shown. The cross-sectional profile of the axial groove 126 may be circular to better facilitate use of the fasteners 22 when the fasteners 22 are self-tapping screws. Together, the axial grooves 26, 126 form shelves within the shell portion 212 that receive and retain the edges of the respective PCBA 20 and power conditioning board 30, as best shown in FIG. 3.

The power conditioning board 30 of FIG. 2 is electrically connected to the PCBA(s) 20 via one or more electrical connector 32, e.g., a typical surface mounted multi-pin power connector block(s). The power conditioning board 30 also includes a contact block 34 having a plurality of conductive pads 36. When the LED module 10 of FIGS. 1 and 2 is fully assembled, the conductive pads 36 are brought into direct physical contact with the contact plate 17. Electrical energy can then flow from an AC power source, through the contact pins 18, into the power conditioning board 30, and ultimately into the PCBA(s) 20 to illuminate the LEDs 24 arranged thereon.

Referring to FIG. 3, the LED module 10 of FIGS. 1 and 2 is shown in a schematic end view with the end caps 16 of FIG. 2 removed for illustrative clarity. The PCBA 20 is positioned within the axial grooves 26 and supported thereby, i.e., with the edges of the PCBA 20 supported by the axial grooves 26. The LEDs 24 are oriented toward the lens portion 112 as noted above. The power conditioning board 30, which is positioned between the PCBA 20 and the shell portion 212, is likewise positioned within the axial grooves 126 between the PCBA(s) 20 and the shell portion 212. The contact block 34 and the conductive pads 36 are aligned such that the conductive pads 36 come into direct physical contact with the contact plate 17 of FIG. 2 when the end caps 16 of the same Figure are installed.

Referring to FIG. 4, the power conditioning board 30 may be a separate circuit board from the PCBA(s) 20 as noted above. In another embodiment, the components of the power conditioning board 30 may be surface mounted on the second surface 27 of the PCBA 20 (see FIG. 2). However, the use of separate boards may be advantageous for optimal thermal management and control.

The power conditioning board 30 may include a surge protector 40, a rectifier 42, a limiter 44, a reducer 48, and a controller 50. The rectifier 42 is electrically connected to the reducer 48 and the LEDs 24 of the PCBAs 20 via a first circuit path 58. The reducer 48 is electrically connected to the LEDs 24 via a second circuit path 60. The limiter 44 is electrically connected to the LEDS 24 via a third circuit path 62.

Additionally, the controller 50 is in communication with the reducer 48 and the limiter 44 over respective first and second control channels 63 and 65, e.g., wireless or hard wired communications busses. The controller 50 is configured to control the LEDS 24 of the PCBA(s) 20 via a method 100, an example of which is described below with reference to FIG. 5. The controller 50 receives LED calibration data (arrow 52) describing the particular type(s) and personality or behavior of LEDs 24 used with the one or more PCBA(s) 20 of the LED module 10 of FIG. 1. Such LED personality data (arrow 52) may be received from an external LED data source 54, for instance via uploading or manual data entry from a manufacturer data sheet.

AC line power is delivered from an AC power source 46, such as a wall socket or a main circuit panel, to the LED module 10 via the electrical contact pins 18 shown in FIGS. 1 and 2. The surge protector 40 is configured to protect the remaining components of the PCBA(s) 20 and power conditioning board 30 from power surges or short circuit conditions. The surge protector 40 may be embodied as a metal oxide varistor or other suitable component capable of diverting excess voltage to ground during a transient power spike, as is well understood in the art.

The rectifier 42 of FIG. 4 is configured to rectify the AC line voltage from the AC power source 46 into a calibrated DC peak-to-peak sine wave, for example a sine wave measuring 1.414 times the AC line voltage. Thus, a 277 VAC root mean square (RMS) line voltage in this particular example could be rectified to a 392 VDC peak-to-peak signal at the output of the rectifier 42. The output of the rectifier 42 feeds into the PCBA 20 through a first circuit path (arrow 58), with the PCBA 20 shown in FIG. 4 as an example series of multiple serially-connected PCBAs 20. As shown in FIG. 1, however, any number of PCBAs 20 may be used within the scope of the present invention. Alternatively, the output of the rectifier 42 feeds into the reducer 48 through a fourth circuit path (arrow 59). The controller 50 determines which of the two mutually exclusive circuit paths (arrows 58 and 59) to use as set forth below.

The output of the PCBA(s) 20 feeds into the limiter 44. The limiter 44 may use field effect transistors (FETs) and other circuit components to perform its required tasks, which is to selectively limit electrical current delivered to the LEDs 24 as explained below. Such a device may be useful in case of brown outs or other electrical faults induced by the power grid where a re-initialization of the controller 50 may be required. Use of the limiter 44 may therefore help ensure that the LED module 10 remains operational during such a fault condition.

Conventionally, the output voltage of the LEDs 24 would be presented to a magnetic core or a transformer through a power switching circuit. Such components are eliminated from the present design, along with their inherent inefficiencies. That is, conventionally a current in a transformer is switched on and off at a rate required to obtain a desired output voltage, with the current determined by transformer selection and wire winding ratio. Electrical and magnetic noise caused by the switching frequency of the power switching circuit generates electromagnetic interference or EMI. Such noise can travel along any wires connected to a lamp using such a conventional design.

The present approach instead feeds the output of the rectifier 42 to the LEDs 24 directly, at times directly and at other times via the reducer 48. Again, the output of rectifier 42 may be a DC peak-to-peak sine wave measuring 1.414 times the AC line voltage. The reducer 48 detects the peak of the AC voltage waveform and AC phase angle from the rectifier 42, and presents this and other variables to the controller 50 for processing.

The controller 50 may be embodied as a microprocessor and any necessary supporting circuitry that collectively controls the LEDs 24 in a real-time and in a closed-loop. The controller 50 enables the LEDs 24 to turn on or off at specific times and for a specific duration. The controller 50 synchronizes this on/off sequence to the phase of the AC line power from source 46. The resulting power factor increase allows for efficient AC line power transfer from the source 46 to the LED module 10.

As is understood in the art, the LEDs 24, as with all LEDs, have a forward voltage drop, i.e., a V(f) drop, as an electrical atomic structural manifestation in light generation. When connected in electrical series, the forward voltage drop of the LEDs 24 add together to create a gradual voltage drop from a high-voltage source, e.g., the output of the reducer 48, to a low-voltage level. The natural forward voltage drop of the LEDs 24 is utilized by the controller 50 to limit the drive power provided to the LEDs 24. The closer the overall voltage drop is to the input line voltage from the rectifier 42, the lower the non-light emitting heat loss within the LED module 10, thus increasing power conversion efficiency.

The controller 50 closely monitors and varies the system parameters to the reducer 48 and limiter 44 in real time to stabilize the LED drive power to the LEDs 24, and other functions described herein. Such software and hardware-driven parameter adjustments via the controller 50 results in a substantially constant power level as presented to the LEDs 24 irrespective of AC line voltage fluctuations. The above feature is considered a significant advantage as compared to conventional approaches.

Because LED parameters tend to change with technology improvements and vary across LED manufacturers, the controller 50 of FIG. 4 can also receive LED calibration data (arrow 52) from the LED data source 54 as noted above. This may occur prior to test and delivery of the LED module 10. In this manner, the behavior of the LEDs 24 can be captured in the calibration data (arrow 52) to fine tune the behavior or personality of the LED module 10. Additionally, because line power can be selectively dimmed using a conventional rheostat, the LEDs 24 of the present LED module 10 can also be dimmed, unlike conventional AC/DC designs.

Figure 5:
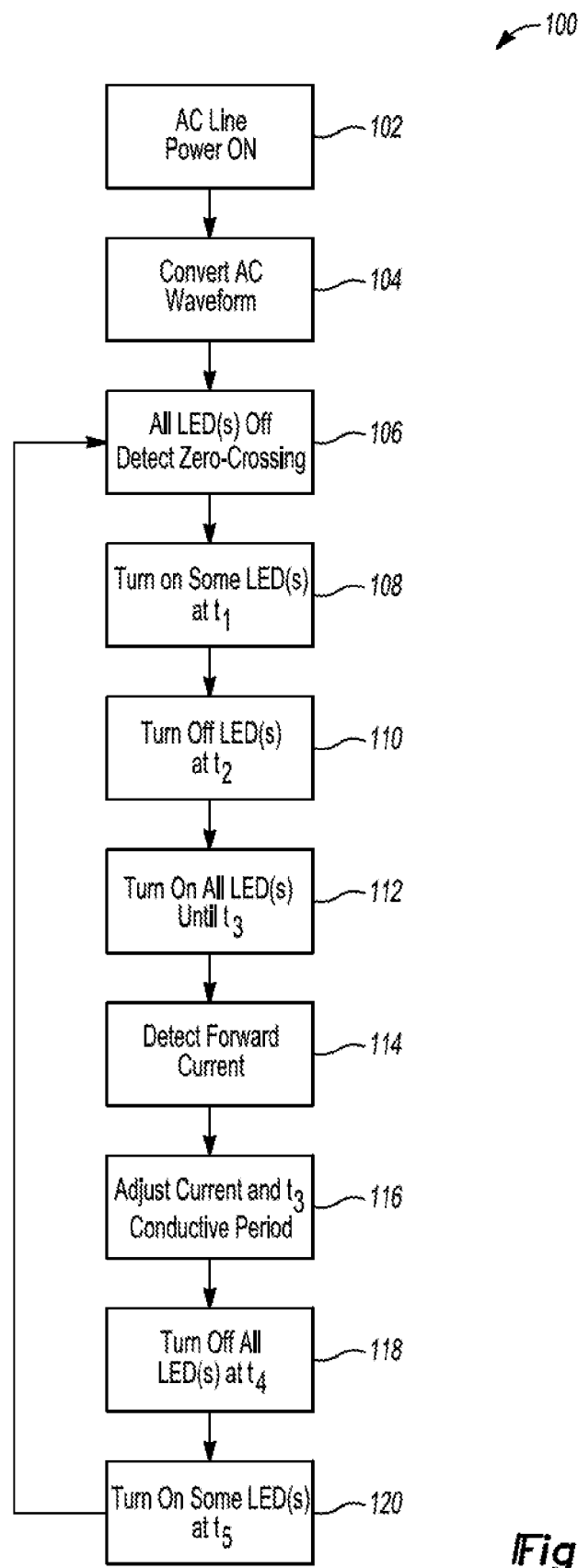
FIG. 5 is a flow chart describing an example method for controlling the LED module of FIGS. 1-3 using the circuit shown in FIG. 4.

Referring to FIG. 5 in conjunction with the structure shown in FIG. 4, an example method 100 of controlling the LED module 10 of FIG. 1 begins with step 102, wherein AC power is provided from the source 46 to the LED module 10. For instance, a wall switch (not shown) may be turned on. As is understood in the art, AC power may be represented as a sine wave, and may be provided by two or more AC power lines, e.g., 277 VAC RMS with a 60 Hz frequency.

At step 104, the rectifier 42 converts the waveform, which is first passed through the surge protector 40, into a full wave, e.g., 392 VDC peak, at twice the frequency, for instance 120 Hz in keeping with the 60 Hz example of step 102. In this embodiment, the time between zero-crossings of the AC sine wave is 0.00833 seconds.

At step 106, the reducer 48 detects the zero-crossing of the sine wave and communicates the detected zero-crossing to the controller 50 over the first control channel 63. All LEDs 24 are extinguished at this point.

At step 108, some LEDS 24 are turned on as the controller 50 synchronizes its internal firmware timers to the zero-crossing, and then commands the reducer 48 to turn on one or more of the LEDS 24 at a specific time from the zero-crossing, and for a calibrated duration. The specific number/duration may be selected based on the personality data for the LED type used in the PCBAs 20. This number/duration information is communicated to the LEDs 24 over the second circuit path (arrow 60).

At step 110, at a specific time from the zero-crossing, but before the sine wave midpoint, the controller 50 commands the reducer 48 to turn off/extinguish the LEDs 24 it previously illuminated at step 108.

At step 112, when the rectifier voltage exceeds the combined LED forward voltage V(f), the LEDS 24 will start conducting current, thereby illuminating all of the LEDs 24. Conduction occurs at a period after the reducer 48 is commanded to turn off, but before the sine wave peaks at the sine wave midpoint.

At step 114, current flows from the rectifier 42 through the LEDS 24 over the first circuit path (arrow 58), then through the limiter 44 to ground. The limiter 44 detects the ground current and communicates the value to the controller 50 via the second control channel 65. All LEDS 24 remain on.

At step 116, the controller 50, using embedded firmware, commands the limiter 44 over channel 65 to increase or decrease resistance to ground in order to limit the LED forward current to an operational window. The operation window is determined by LED calibration data (arrow 52) for the types of LEDS 24 used on the PCBA(s) 20. Constant power is thus maintained to the LEDs 24 during conduction by adjusting the forward current for the varying AC line voltage levels.

At step 118, the LEDS 24 are extinguished when the sine wave from the rectifier 42 falls below the combined LED forward voltage drop V(f). The limiter 44 detects when the forward current is zero and communicates this event to the controller 50 over the second control channel 65. All LEDs 24 are off at the completion of step 118.

At step 120, the controller 50 commands the reducer 48 over channel 63 to turn on one or more LEDs 24 at a time after the current drop equals zero, doing so according to the LED calibration data (arrow 52). The LEDS 24 are illuminated for a period that may extend up to the next sine wave zero-crossing. At the next zero-crossing, the firmware timers of the controller 50 are reset and the reducer 48 is commanded to turn off all of the LEDs 24 over the second circuit path (arrow 60).

While the best modes for carrying out the invention have been described in detail, those familiar with the art to which this invention relates will recognize various alternative designs and embodiments for practicing the invention within the scope of the appended claims.

The invention claimed is:

1. A light-emitting diode (LED) module comprising:
 a body assembly;
 a printed circuit board assembly (PCBA) encapsulated by the body assembly, wherein the PCBA includes a plurality of light emitting diodes (LEDs); and
 a power conditioning board that is characterized by an absence of a switching power supply, wherein the power conditioning board includes:
  a full-wave voltage rectifier that is electrically connectable to a source of alternating current (AC) line power and configured to output a peak-to-peak rectified voltage as a function of the AC line power;
  a reducer that is electrically connected to an output side of the rectifier, wherein the reducer is configured to:
   detect the peak-to-peak rectified voltage, a phase angle of the AC line power, and a waveform zero-crossing of the AC line power;
   reduce the peak-to-peak rectified voltage to provide a reduced voltage; and
   selectively turn the plurality of LEDs on or off using corresponding signals;
  a limiter that is electrically connected to the LEDs; and
  a controller arranged in a closed control loop with the LEDs via the reducer and the limiter;
 wherein the controller is configured to:
  receive the reduced peak-to-peak rectified voltage and AC waveform zero-crossing from the reducer;
  automatically adjust operating parameters of the reducer in response to the detected phase angle and AC waveform zero-crossing to thereby selectively illuminate or extinguish at least one of the plurality of LEDs, and to thereby increase the power factor of the LED module; and
  adjust a characteristic of the limiter to thereby provide a substantially constant power level to the plurality of LEDs.

2. The LED module of claim 1, wherein the body includes a lens portion and a thermally conductive shell portion.

3. The LED module of claim 1, wherein the plurality of LEDs has a forward voltage drop that is substantially equivalent to the voltage output of the rectifier.

4. The LED module of claim 1, wherein the controller is configured to receive LED data from an external data source describing behavior of the plurality of LEDs, and to control of the plurality of LEDs using the LED data.

5. The LED module of claim 1, wherein the limiter, in closed-loop communication with the controller, is configured to automatically adjust a resistance value of the limiter as the characteristic to thereby limit a forward current of the plurality of LEDs.

6. The LED module of claim 1, wherein the PCBA includes a plurality of PCBAs connected end-to-end.

7. The LED module of claim 1, wherein the body assembly defines a first set of axial grooves that support the PCBA and a second set of axial grooves that support the power conditioning board.

8. The LED module of claim 7, wherein the second set of axial grooves is parallel to the first set of axial grooves.

9. The LED module of claim 7, wherein the second set of axial grooves has a circular cross-section and receives a threaded fastener therein.

10. A light-emitting diode (LED) module comprising:
 a two-piece body assembly including a plastic lens portion and an aluminum shell portion, wherein the aluminum shell portion defines a first set of axial grooves positioned adjacent to the lens portion and a second set of axial grooves positioned between the first axial groove and the shell portion;
 a printed circuit board assembly (PCBA) encapsulated by the body assembly, wherein the PCBA includes a plurality of light emitting diodes (LEDs) oriented toward the lens portion and is supported along its edges by the first set of axial grooves; and
 a power conditioning board that is characterized by an absence of a switching power supply, wherein the power conditioning board is supported along its edges by the second set of axial grooves and includes:
  a full-wave voltage rectifier that is electrically connectable to a source of alternating current (AC) line power and configured to output a peak-to-peak rectified voltage as a function of the AC line power;
  a reducer that is electrically connected to an output side of the rectifier, wherein the reducer is configured to:
   detect the peak-to-peak rectified voltage, a phase angle, and an AC waveform zero-crossing of the AC line power;
   reduce the peak-to-peak rectified voltage to provide a reduced voltage; and
   selectively turn the LEDs on or off using corresponding signals;
  a limiter that is electrically connected to the PCBA; and
  a controller arranged in a closed control loop with the PCBA via the reducer and the limiter;

wherein the controller is configured to:
  receive the reduced peak-to-peak rectified voltage from the reducer;
  automatically adjust operating parameters of the reducer in response to the detected phase angle and the AC waveform zero-crossing to thereby selectively illuminate or extinguish at least one of the plurality of LEDs, and to thereby increase the power factor of the LED module; and
  adjust a characteristic of the limiter to thereby provide a substantially constant power level to the plurality of LEDs.

11. The LED module of claim 10, further comprising a plurality of self-tapping screws, wherein the second set of axial grooves has a circular cross-section, and wherein each groove receives one of the self-tapping threaded fastener within the circular cross-section.

12. A method for controlling a light-emitting diode (LED) module comprising:
  supplying AC line power to the LED module, wherein the LED module includes a power conditioning board;
  using a rectifier of the power conditioning board to convert the AC line power into an AC sine wave;
  detecting a zero-crossing of the AC sine wave using a reducer that is electrically connected to an output side of the rectifier;
  detecting a peak-to-peak rectified voltage and a phase angle of the AC line power;
  reducing the rectified voltage to provide a reduced voltage;
  selectively turning the plurality of LEDs on or off using corresponding signals;
  receiving the reduced peak-to-peak rectified voltage by the controller that is mounted to the power conditioning board;
  automatically adjusting operating parameters of the reducer in response to the detected phase angle and zero-crossing of the AC sine wave to selectively illuminate or extinguish at least one of the plurality of LEDs and thereby increase the power factor of the LED module; and
  adjusting a characteristic of the limiter to thereby provide a substantially constant power level to the plurality of LEDs.

13. The method of claim 12, further comprising:
commanding the reducer to turn on one or more of the LEDS at a specific time from the zero-crossing for a calibrated duration; and
commanding the reducer to turn off the LEDs before a midpoint of the sine wave.

14. The method of claim 12, further comprising:
illuminating all of the LEDs when the rectifier voltage exceeds the combined LED forward voltage (V(f)) and before the sine wave peaks at the sine wave midpoint.

15. The method of claim 12, further comprising:
using the limiter to detect a ground current; and
adjusting a resistance value of the limiter to thereby limit the LED forward current.

16. The method of claim 12, further comprising:
receiving LED data from an external data source describing behavior of the plurality of LEDs; and
controlling the plurality of LEDs using the LED data.

17. The method of claim 12, further comprising:
automatically adjusting a resistance value of the limiter as the characteristic to thereby limit a forward current of the plurality of LEDs.

* * * * *